United States Patent
Juelfs et al.

(10) Patent No.: US 7,406,555 B2
(45) Date of Patent: Jul. 29, 2008

(54) SYSTEMS AND METHODS FOR MULTIPLE INPUT INSTRUMENTATION BUSES

(75) Inventors: Rodney A Juelfs, Seattle, WA (US); Andrew S. Roth, Everett, WA (US)

(73) Assignee: The Boeing Company, Chicago, IL (US)

( * ) Notice: Subject to any disclaimer, the term of this patent is extended or adjusted under 35 U.S.C. 154(b) by 229 days.

(21) Appl. No.: 11/118,026

(22) Filed: Apr. 29, 2005

(65) Prior Publication Data

US 2006/0248249 A1    Nov. 2, 2006

(51) Int. Cl.
*G06F 13/372* (2006.01)
(52) U.S. Cl. .................. 710/124; 370/230; 709/240
(58) Field of Classification Search ............... 710/122, 710/124, 316; 709/240; 370/230
See application file for complete search history.

(56) References Cited

U.S. PATENT DOCUMENTS

| | | | | |
|---|---|---|---|---|
| 3,755,785 A | * | 8/1973 | Kirk ............................. 710/51 |
| 3,921,138 A | * | 11/1975 | Burns et al. .................. 340/2.6 |
| 4,090,034 A | * | 5/1978 | Moylan ................. 379/115.01 |
| 4,754,401 A | * | 6/1988 | Kaczynski et al. ............ 365/63 |
| 5,051,985 A | * | 9/1991 | Cidon et al. ................ 370/452 |
| 5,182,747 A | * | 1/1993 | Frenzel et al. .............. 370/452 |
| 5,206,857 A | * | 4/1993 | Farleigh ..................... 370/452 |
| 5,400,334 A | * | 3/1995 | Hayssen ..................... 370/245 |
| 5,414,645 A | | 5/1995 | Hirano |
| 5,430,663 A | | 7/1995 | Judd et al. |
| 5,463,624 A | * | 10/1995 | Hogg et al. ................. 370/461 |
| 5,485,453 A | * | 1/1996 | Wahlman et al. ........... 370/389 |
| 5,522,047 A | * | 5/1996 | Grow et al. ................. 709/251 |
| 5,546,403 A | * | 8/1996 | Yamamoto et al. .......... 714/716 |
| 5,576,972 A | | 11/1996 | Harrison |
| 6,013,108 A | | 1/2000 | Karolys et al. |
| 6,018,782 A | * | 1/2000 | Hartmann .................... 710/310 |
| 6,055,225 A | * | 4/2000 | Wu ............................. 370/222 |
| 6,055,228 A | * | 4/2000 | DeKoning et al. .......... 370/258 |
| 6,101,166 A | * | 8/2000 | Baldwin et al. ............. 370/222 |
| 6,195,690 B1 | | 2/2001 | Weinreb |
| 6,307,896 B1 | | 10/2001 | Gumm et al. |
| 6,449,054 B1 | | 12/2002 | Hesselink et al. |

(Continued)

FOREIGN PATENT DOCUMENTS

JP    2003046479 A  *  2/2003

OTHER PUBLICATIONS

"LXT973 Twisted-Pair-to-Fiber Media Converter Board", Application note, Intel, pp. 1-15, order No. 249945-002, Feb. 2002.

(Continued)

*Primary Examiner*—Paul R Myers
(74) *Attorney, Agent, or Firm*—Lee & Hayes, PLLC (57) ABSTRACT

Systems and methods for multiple input instrumentation buses are disclosed. In one embodiment, a bus assembly includes a control module adapted to be coupled to a network, and a plurality of nodes operatively coupled in a linear topology. A plurality of interface modules are coupled to the nodes. At least one node is adapted to receive a primary response signal from the correspondingly coupled interface module, and a secondary response signal from at least one other node, and to determine which of the primary and secondary response signals arrived first, and to output a corresponding one of the primary and secondary response signals that arrived first.

14 Claims, 8 Drawing Sheets

U.S. PATENT DOCUMENTS

| | | | |
|---|---|---|---|
| 6,539,225 B1 * | 3/2003 | Lee | 455/436 |
| 6,683,553 B1 | 1/2004 | Pai | |
| 6,701,399 B1 * | 3/2004 | Brown | 710/114 |
| 6,708,239 B1 | 3/2004 | Ellerbrock et al. | |
| 6,816,862 B2 | 11/2004 | Mulgund et al. | |
| 6,920,006 B2 * | 7/2005 | Chiba | 360/69 |
| 6,961,306 B2 * | 11/2005 | Ying | 370/222 |
| 7,154,879 B1 * | 12/2006 | Pfeffer et al. | 370/352 |
| 2002/0012401 A1 * | 1/2002 | Karolys et al. | 375/257 |

OTHER PUBLICATIONS

"Intel Carrier Class Ethernet", White Paper, Intel, pp. 1-20, document No. 249949, revision No. 003, Jan. 2004.

"Draft Standard for Smart Transducer Interface for Sensors and Actuators", IEEE-P1451, http://www.motion.aptd.nist.gov/group3.htm, pp. 1-7, Mar. 2003.

* cited by examiner

| | BUS SPEED (Mbps) | PACKET SIZE | $T_{pd}$ uSec |
|---|---|---|---|
| ETHERNET BUS WITH 32 NODES | 100 | 1500 MAX WITH 18 BYTES OVERHEAD | 16 |
| HPNA | 14 | 46 | 116 |
| HPNA | 14 | 1000 | 741 |
| HPNA | 10 | 46 | 127 |
| HPNA | 10 | 1000 | 971 |
| HPNA | 6 | 46 | 153 |
| HPNA | 6 | 1000 | 1507 |

SYSTEMS AND METHODS FOR MULTIPLE INPUT INSTRUMENTATION BUSES

FIELD OF THE INVENTION

This invention relates to data buses, and more specifically, to improved systems and methods for multiple input instrumentation buses for use with, for example, distributed multidrop transducer systems and networks.

BACKGROUND OF THE INVENTION

Some types of instrumentation systems involve the interfacing of a plurality of inputs from multiple transducers and other input sources. To address these circumstances, the Institute of Electrical and Electronics Engineers (IEEE) Standards Association has developed a standard for interfacing multiple, physically separated transducers that allows for the time synchronization of data, known as IEEE 1451.3 "Standard for a Smart Transducer Interface for Sensors and Actuators, Digital Communication and Transducer Electronic Data Sheet (TEDS) Formats for Distributed Multidrop Systems." In brief, the standard attempts to provide a minimum implementation for the self-identification, multidrop, hot swapping and configuration of transducers in such instrumentation systems and networks.

Figure 1:
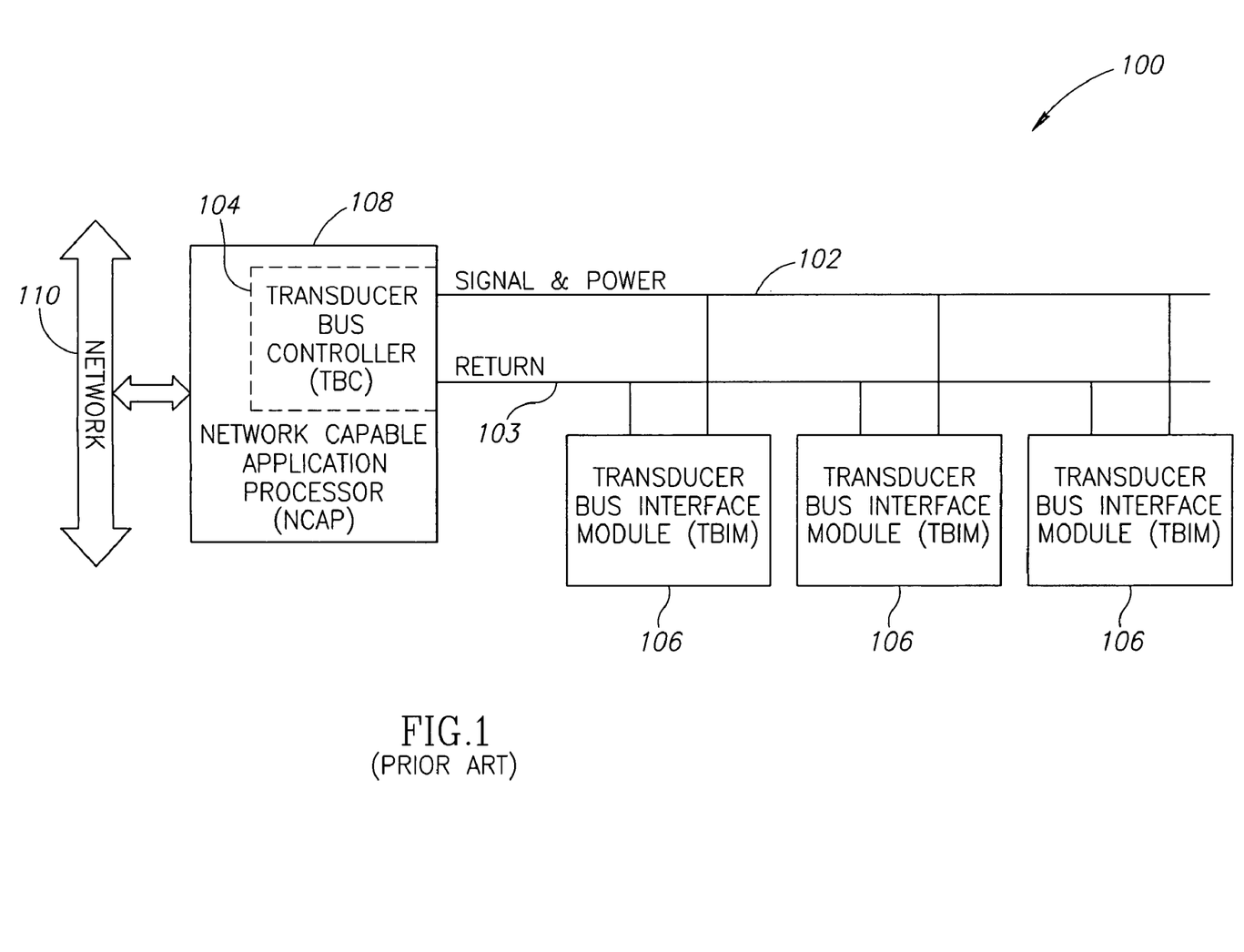
FIG. 1 is a multidrop instrumentation system in accordance with the prior art.

For example, FIG. 1 is a multidrop instrumentation system 100 as contemplated by the IEEE 1451.3 standard. The system 100 includes a first transmission line 102 coupled between a Transducer Bus Controller (TBC) 104 of a Network Capable Application Processor (NCAP) 108 and a plurality of Transducer Bus Interface Modules (TBIM) 106. The first transmission line 102 is used to supply power to the TBIMs 106 and to carry communication signals between the TBIMs 106 and the bus controller 104. A second transmission line 103 serves as a network communications channel and is used to establish the basic network communications that allows the bus controller 104 to determine the capabilities and configuration of each TBIM 106. This portion between the TBIMs and TBC is considered the physical layer of the system. In turn, the NCAP 108 is coupled to a network 110, and contains the bus controller 104 and an interface to the network 110 that may support many other buses. Each TBIM 106 may contain one or more different transducers or other signal generators.

Although desirable results have been achieved using such systems, the IEEE 1451.3 standard may not be reliable or suitable for some types of distributed multidrop transducer systems and networks.

SUMMARY OF THE INVENTION

The present invention is directed to systems and methods for multiple input instrumentation buses. Embodiments of the present invention may advantageously reduce propagation delays, may consume less power, may cost less, and may operate more robustly in a wider variety of environments in comparison with prior art systems.

In one embodiment, a bus assembly includes a control module adapted to be coupled to a network, and a plurality of nodes operatively coupled in a linear topology. A first one of the nodes is coupled to the control module. The bus assembly further includes a plurality of interface modules, each interface module being coupled to a corresponding one of the nodes. At least one node is adapted to receive a primary response signal from the correspondingly coupled interface module and a secondary response signal from at least one other node, and to determine which of the primary and secondary response signals arrived first, and to output a corresponding one of the primary and secondary response signals that arrived first. In another embodiment, the interface modules may be adapted to communicate using a set of point-to-point linear Ethernet communications. In a further embodiment, the interface modules are adapted to communicate using a communication unit that includes at least one of an isochronous portion and an asynchronous portion.

BRIEF DESCRIPTION OF THE DRAWINGS

Embodiments of the present invention are described in detail below with reference to the following drawings.

DETAILED DESCRIPTION

The present invention relates to systems and methods for multiple input instrumentation buses. Many specific details of certain embodiments of the invention are set forth in the following description and in FIGS. 2-9 to provide a thorough understanding of such embodiments. The present invention may have additional embodiments, or may be practiced without one or more of the details described for any particular described embodiment.

Figure 2:
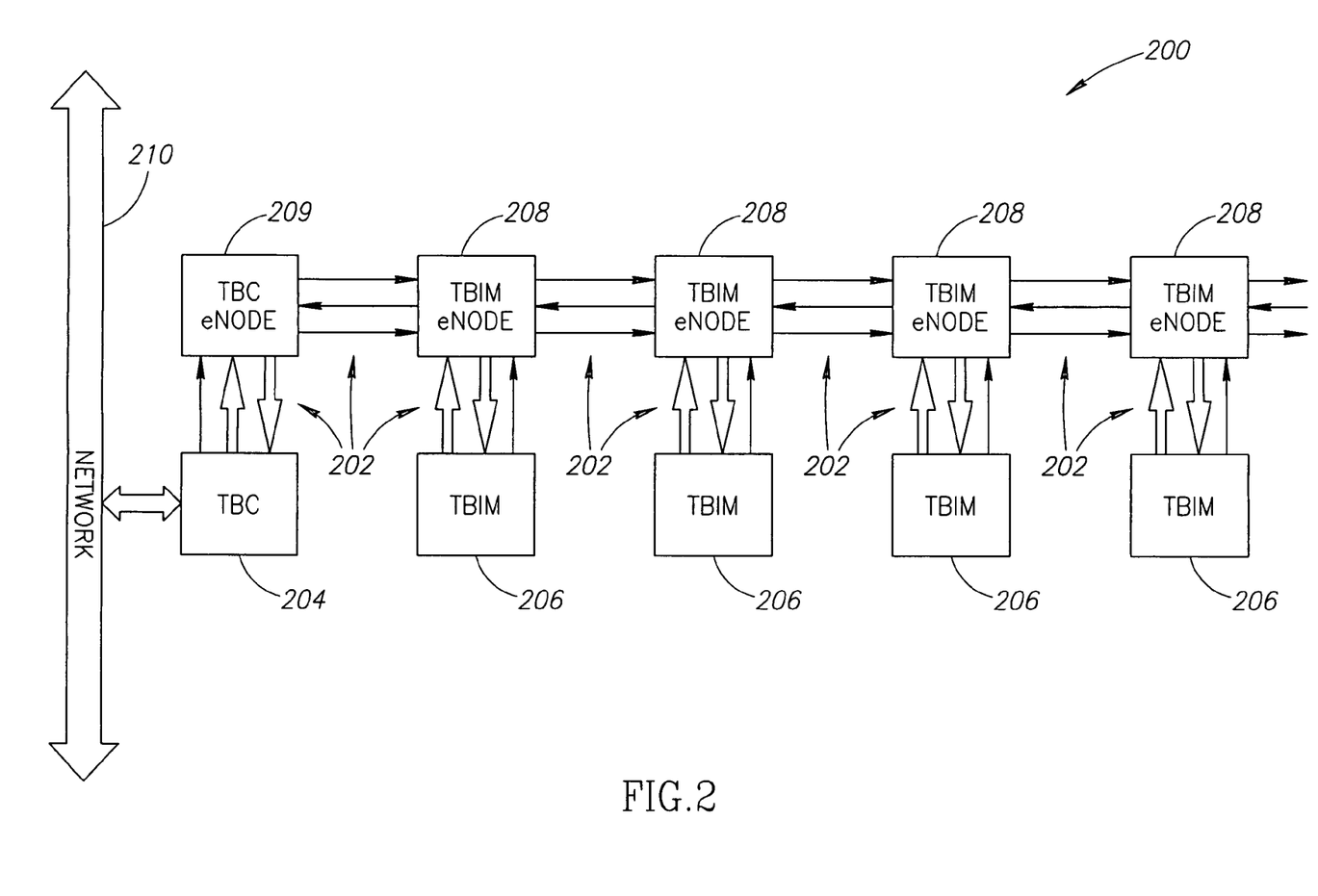
FIG. 2 is a transducer bus for a multidrop instrumentation system in accordance with an embodiment of the present invention.

FIG. 2 is a transducer bus 200 for a multidrop instrumentation system in accordance with an embodiment of the present invention. In this embodiment, the transducer bus 200 includes a Transducer Bus Controller (TBC) 204 and a plurality of Transducer Bus Interface Modules (TBIMs) 206. Each TBIM node (or eNode) 208 is coupled to another corresponding TBIM node (or eNode) 208 by a plurality of pairs of conductors 202a (e.g. three or four pairs). Each (TBIM) 206 is coupled to the TBIM node 208 by the Physical Independent Interface (or PII) 202b. Similarly, adjacent TBIM nodes 208 are coupled by pairs of conductors 202a, and the TBC node (or eNode) 209 is coupled to the TBIM node 208 by the pairs of conductors 202a. The TBC 204 is coupled to a TBC node 209 by the PII 202b. The pairs of conductors 202a carry both the power and the signals to implement the transducer bus 200. The conductors in the PII 202b carry the signals necessary to implement the Physical Independent Interface between the TBIM node 208 and the TBIM 206 or the TBC node 209 and the TBC 204.

As shown in FIG. 2, each TBIM 206 is coupled via the TBIM nodes 208 in a linear or "daisy chain" topology to the other components of the transducer bus 200. This may be accomplished by adapting each TBIM node 208 to function in a terminate and repeat mode, which means that all packets from the TBC 204 received by every TBIM node 208 on the bus 200 would be clocked in, buffered, and clocked out the other side. Similarly, all packets returning to the TBC 204 would be routed through a switch within each TBIM node 208, with a first event detect circuit controlling the switch, as described more fully below with respect to FIG. 4.

The following describes how particular embodiments of the invention may be used within the context of IEEE 1451.3 and IEEE 802.3. More specifically, in one embodiment, the communication of each TBIM 206 is implemented using a combination of point-to-point 100BASE-T Linear Ethernet communications based on IEEE Std. 802.3-2002 standard, and transducer bus specific signals. The transducer bus 200 combines power, a composite signal, and Ethernet communication signals on the pairs of conductors 202a, consisting of a transmit pair, a receive pair, a composite pair and a power pair. In one embodiment, the composite signal is a pulse width modulated signal combining a synchronization signal (e.g. 2 MHz) and an epoch signal. The synchronization signal may assure that all TBIMs 206 on the bus 200 have access to a clock running at the same frequency.

More specifically, in one aspect, the Ethernet data link layer specifications may be those provided in Paragraph 22 of IEEE Std. 802.3-2002, incorporated herein by reference, which includes error, collision, carrier sense and management signals. In another aspect, however, a collision avoidance strategy is superimposed on the transducer bus 200 wherein the bus executes in an isochronous mode followed by an asynchronous mode within a periodic interval called an Epoch. The TBIMs 206 detect and keep track of the communication modes based on information decoded from the composite signal. In one particular embodiment, the data rate is 100 Mb/s and uses a 4B/5B block coding scheme, and the mode is full duplex. A dedicated eight wire bus segment 202a is connected between the TBIM nodes 208, or between the TBC node 209 and the TBIM nodes 208. This may be referred to as a point-to-point Linear Ethernet bus segment.

Isochronous communication may be based on a Time Division Multiple Access (TDMA) allocation of bandwidth, such that each TBIM 206 on the transducer bus 200 may have a dedicated portion of an interval during which it may transmit messages, and is then prohibited from transmitting during the remainder of that interval. The transducer bus 200 may periodically have an isochronous interval during which these rules prevail. The TBC 204 subdivides the isochronous interval into a fixed number of time slots and allocates unique slots to each active transducer channel. The number of adjacent time slots assigned to a transducer channel is preferably large enough to transmit a complete message.

Figure 3:
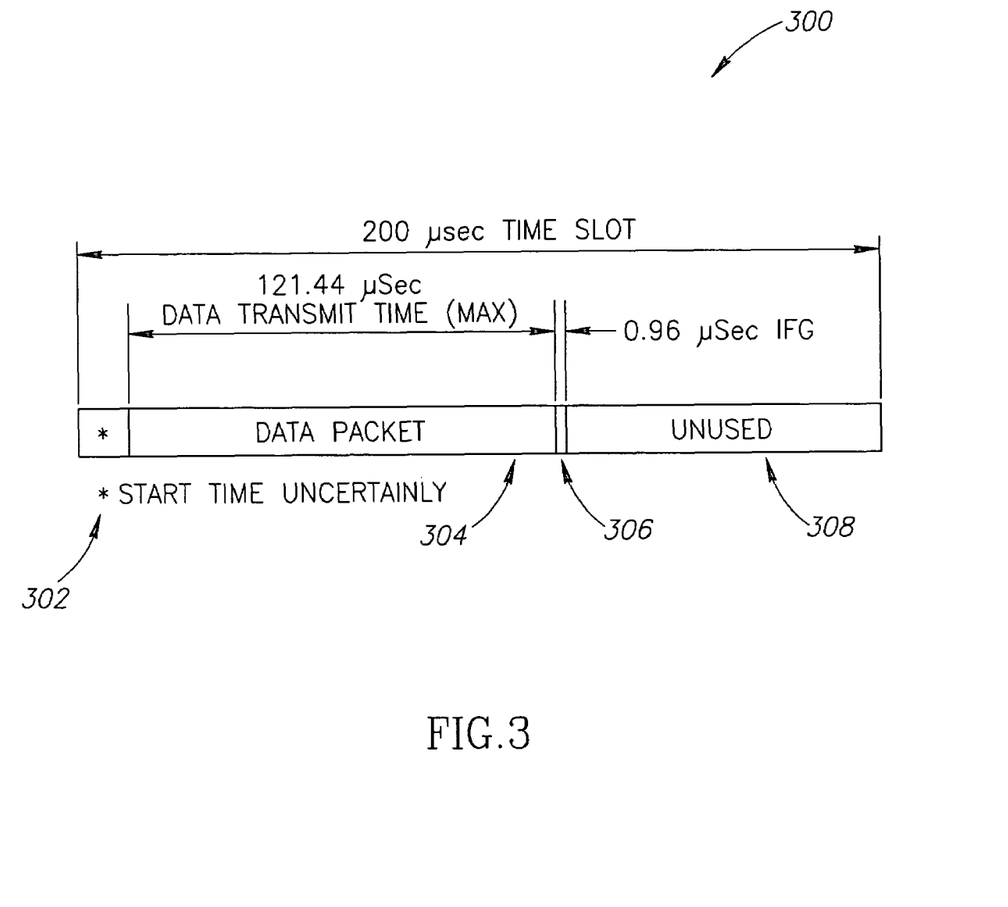
FIG. 3 shows a transmission of a representative packet that occupies a single time slot that may be applicable for an embodiment of the invention.

FIG. 3 shows a transmission of a representative packet that occupies a single time slot 300 that is applicable for an embodiment of the invention. In this embodiment, the time slot 300 is a time interval that is divided into four segments. First, a start time uncertainty segment 302 is the maximum time required by the TBC 204 or the TBIM 206 to place the frame on the bus 200 after the start of the time slot 300. The start time uncertainty segment 302 is a function of the design and may be zero. Next, a data packet segment 304 is the time available to transmit the packet of data. An Inter Frame Gap (IFG) segment 306 is a mandatory dead time on the bus 200 between the end of one transmission and the start of the next transmission. Finally, a fourth segment 308 is an unused portion of the time slot 300. As further shown in FIG. 3, in one particular embodiment, the time slot 300 has a predefined time of 200 microseconds (μs), and the Ethernet defines the data portion of a communication frame as a maximum of 1500 bytes. With 18 bytes of overhead, a frame requires 121.44 μs with a minimum silence time of 960 nanoseconds (ns). Because of the minimum silence time requirement, a communication frame may occupy the first 122.4 μs of the allocated slot.

The time slots may be numbered beginning with slot zero, which is used by the TBC 204 to transmit the beginning of the epoch message. The last time slot in the isochronous interval may be used to transmit the start asynchronous interval message. In a streaming mode, a transducer channel will acquire a data set and initiate transmission during its assigned time slot in the isochronous interval. The length of a transmission interval (in time slots) is preferably long enough to transmit the entire data set. A maximum-sized data set is defined as the largest data set that will fit within a message transmitted using a Streaming Data Protocol. A message of this size will be fragmented into packets by the Logical Link Control (LLC) layer, as described below. Despite a generous unused portion of the time slot 300, an algorithm used at the NCAP to allocate time slots may be based on one slot per packet. If a transducer channel is sampling data at a rate lower than the epoch rate so that it does not have data to transmit during that epoch, the time slot may go unused.

In further embodiments, asynchronous communications may be used. In some embodiments, asynchronous communication may be initiated at will. More specifically, the transducer bus 200 may periodically have an asynchronous interval during which this is possible. To support both asynchronous and isochronous communication, the transducer bus 200 may cyclically alternate between these communication modes. Asynchronous communication may therefore be initiated during the asynchronous interval.

During the asynchronous interval, however, two TBIMs 206 can initiate a transmission simultaneously. In cases where an unconstrained topology is employed, this simultaneous transmission would result in a collision. Therefore, embodiments of the present invention may include an arbitration at each node 208, 209 that allows only one response to succeed. The other response may be discarded without the sender's knowledge. This strategy is called "survival of the first", and it helps to ensure that the Ethernet MAC/PHY perceives an available media and does not engage collision detection, back off, and retransmission. The "survival of the first" transmission strategy also accommodates precision timing for the duration of the asynchronous and isochronous intervals.

Figure 4:
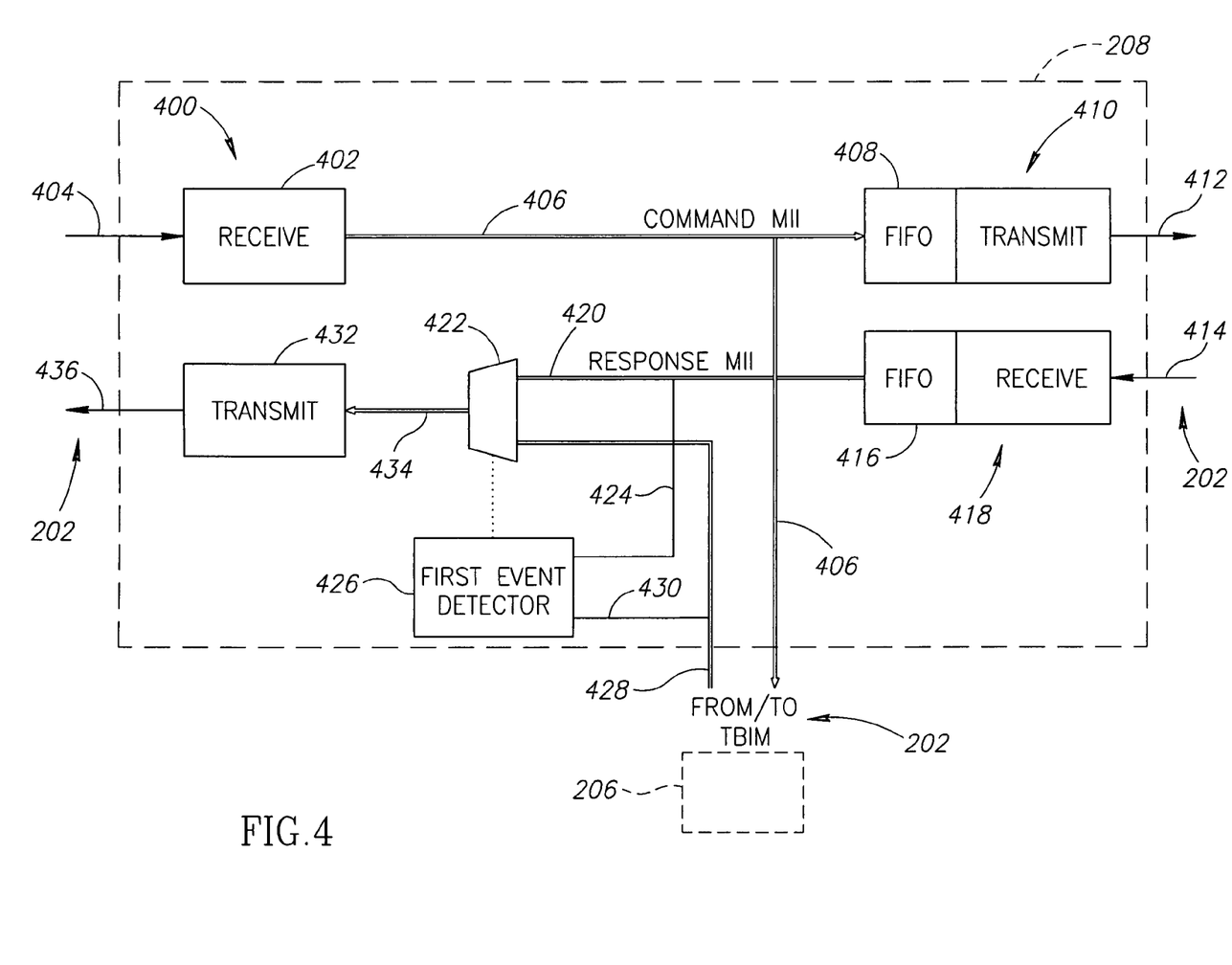
FIG. 4 is a schematic representation of a TBIM node in accordance with an embodiment of the invention.

FIG. 4 is a schematic representation 400 of a TBIM node 208 adapted to implement the "survival of the first" strategy in accordance with an embodiment of the invention. In this embodiment, a first receiving module 402 is coupled to a first lead 404 of an incoming pair of conductors 202, and is adapted to receive a command from the TBC 204 (FIG. 2). The command is then transmitted via a second lead 406 to the TBIM 206 corresponding to the TBIM node 208 and to a First-In-First-Out (FIFO) buffer 408 of a first transmit component 410. The command is transmitted by the first transmit component 412 along a third lead 412 to the next daisy-chained TBIM node 208 in the transducer bus 200. A secondary response may be received along a fourth lead 414 into a FIFO buffer 416 of a second receive component 418. The secondary response is transmitted along a fifth lead 420 to a switch component 422, and along a sixth lead 424 to a first event detector 426. Also, a TBIM response is transmitted from the TBIM 206 along a seventh lead 428 to the switch component 422, and along an eighth lead 430 to the first event detector 426. The first event detector 426 is adapted to receive the secondary response and the TBIM response, and to determine which response arrived first. Based on this determination, the first event detector 426 controls the switch component 422 to cause the first-arriving response to be sent to the second transmit component 432 along a ninth lead 434, and subsequently out of the TBIM node 208 via a tenth lead 436.

Since each TBIM node 208 operates in the terminate-and-repeat mode, each node-to-node segment of the transducer bus 200 acts as a dedicated point-to-point connection. Therefore, any number of TBIM nodes 208 (and TBIMs 206) may be added to the bus 200 as long as the conductors 202 are adapted to provide sufficient power.

The "survival of the first" strategy may be advantageous for a transducer bus 200 on which asynchronous traffic is characterized as Command-Response. For most commands, there is only one or no responder. One exception may be a discovery command wherein discarding the competing responses simplifies the TBC logic. More specifically, the TBC 204 may issue a discovery request and gets a single response from one of the TBIMs 206 that prevailed over all of its competitors in the "survival of the first" environment. The TBC 204 assigns an alias to that TBIM 206 and issues another discovery request. This process may continue until the discovery request fails to solicit a response from any TBIM 206. In one particular embodiment, however, if solicited re-transmissions are not desired, then the asynchronous time slots may be omitted, as described more fully below.

Figure 5:
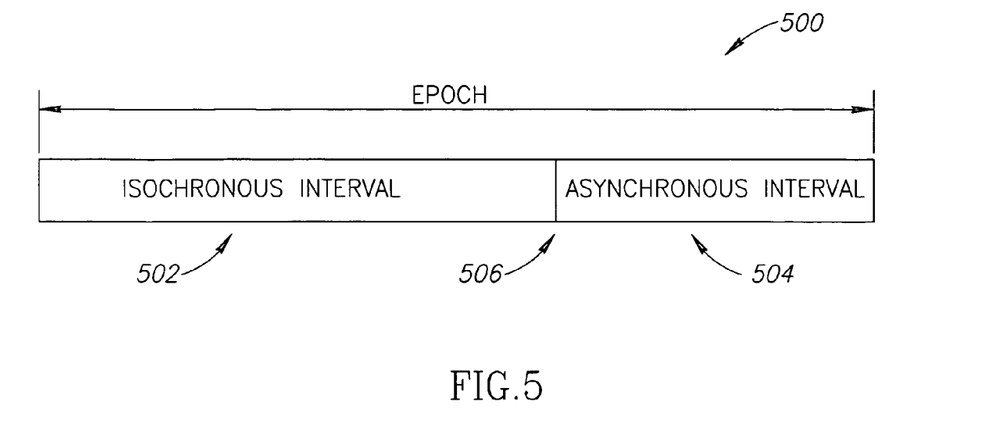
FIG. 5 shows an epoch unit of time that may be applicable for an embodiment of the invention.

In the "survival of the first" topology, there preferably will be no collisions with retransmission as there may be in an HPNA-based (Home Phoneline Network Adapter) topology. Therefore, in another aspect of the invention, some type of discipline may be imposed on the asynchronous period 504 similar to the isochronous period 502. Isochronous time slots (ITS) are assigned by the TBC 206. By implementing asynchronous time slots (ATS), which may be either fixed or assigned by the TBC 206, the desired discipline may be imposed on the asynchronous period 504. For example, in one particular embodiment, a first ATS may be fixed to mean "try until acknowledged". In this case, all TBIM's 208 with infrequent or non-time critical data would continually transmit their data once during each epoch, until the TBC 206 acknowledges receipt of the packet. This alternative may suitably be used to handle any discarded packets resulting from the "survival of the first" operation.

In another aspect, a second ATS could be fixed to mean "send UUID information". With the second ATS, all un-configured TBIM's connected to the bus could transmit their UUID (Universal Unique Identifier) information once per epoch (described below with reference to FIG. 5), until the TBC 206 responds with the configuration information.

In further aspects, 7 ATS numbers could be assigned to "retransmit last data packet". With this assignment, if the NCAP determines that a packet from an individual TBIM is corrupted and needs to be sent again, the retransmission request would include the ATS for the transmission. This could be extended, for example, if more than 7 packets need to be transmitted again.

In embodiments of the present invention, time may be organized into uniformly timed blocks called epochs. FIG. 5 depicts an epoch 500. In this embodiment, each epoch 500 is subdivided into an isochronous interval 502 and an asynchronous interval 504. The time allocated to the isochronous interval 502 varies and is dependent on the number of TBIMs 206 and the transmission time each TBIM 206 requires. The current mode of operation of the bus 200 (isochronous or asynchronous) may be determined by decoding the composite signal to obtain an epoch marker 406 that demarcates the beginning and end of the intervals. The TBC 204 may assign the length of both the isochronous and asynchronous intervals 502, 504 to the bus 200 with a broadcast of a "Define epoch" message. The assignment may be in the form of time slot counts. In turn, the TBIMs 206 may count time slots to detect when their assigned isochronous slot 502 begins, so that they may send their message, and when the asynchronous interval 504 begins. This information may be used to ensure that as the asynchronous interval 504 approaches the end, an impending transmission does not overflow into the next isochronous interval 502.

In particular embodiments, for example, the time length of an epoch is a multiple of a slot time, and the epoch length (the sum of the isochronous interval 502 and the asynchronous interval 504) does not exceed 250 milliseconds (ms). Similarly, in some embodiments, the time length of the isochronous interval 502 may be a multiple of the slot time, and may have a minimum length of 400 μs (e.g. 2 slots), and a maximum length of 240 ms. In still further embodiments, the time length of the asynchronous interval 504 may be a multiple of the slot time, and may have a minimum length of 10 ms.

Figure 6:
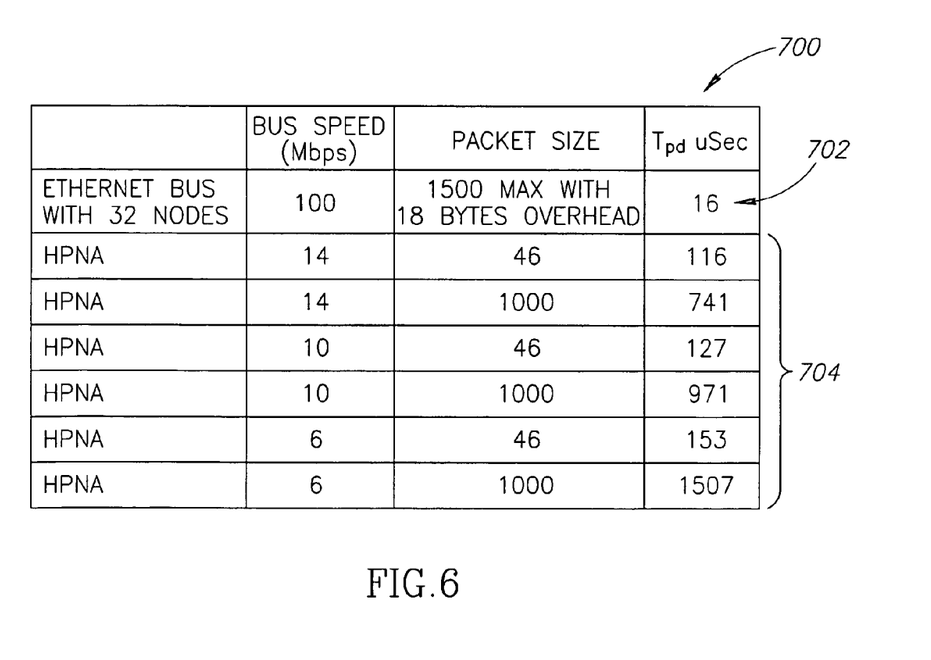
FIG. 6 shows a graph comparing an estimated propagation delay ($T_{pd}$) through a transducer bus with prior art systems in accordance with another embodiment of the invention.

Embodiments of the present invention may provide significant advantages over the prior art. For example, the propagation delay of data passing through the transducer bus 200 may be improved in comparison with other prior art alternatives. More specifically, in one embodiment, it takes approximately 40 nanoseconds (ns) to get each nibble, i.e. 4 bits, of data into a repeater (or Command MII FIFO) within each TBIM node 208 in order to pass the unchanged data through to the next bus segment, e.g. TBIM 206 or another TBIM node 208. If we assume that it takes another approximately 40 ns to clock each nibble out of the repeater, then add another approximately 20 ns for delay through the logic, this adds up to approximately 100 ns. If we multiply this figure by a safety factor of five, we can estimate that the propagation delay through each TBIM node 208 is approximately 0.5 μs. This delay does not change with the size of the packet. However, each TBIM node added to the transducer bus 202a may add this propagation delay to the total transducer bus propagation delay. FIG. 6 shows a graph 700 comparing an estimated propagation delay ($T_{pd}$) 702 through a transducer bus having 32 TBIM nodes 208 with corresponding propagation delays 704 through various commercially-available HPNA-based buses in accordance with the prior art. Based on the data shown in FIG. 6, embodiments of the present invention may advantageously reduce the propagation delay $T_{pd}$ of data passing through buses in comparison with other prior art alternatives.

Furthermore, embodiments of the present invention may advantageously employ one or more of the upper layers of the IEEE 1451.3 protocol, as used for an HPNA-based solution. Since embodiments of the present invention may employ carrier class Ethernet components, these components may be suited to operate in harsh environments for longer periods, including environments that include low-grade cabling, high electromagnetic interference, and extreme temperatures. Embodiments of the present invention may require less power in comparison with alternate HPNA implementations, and may have greater availability and lower cost in comparison with alternate prior art systems.

Figure 7:
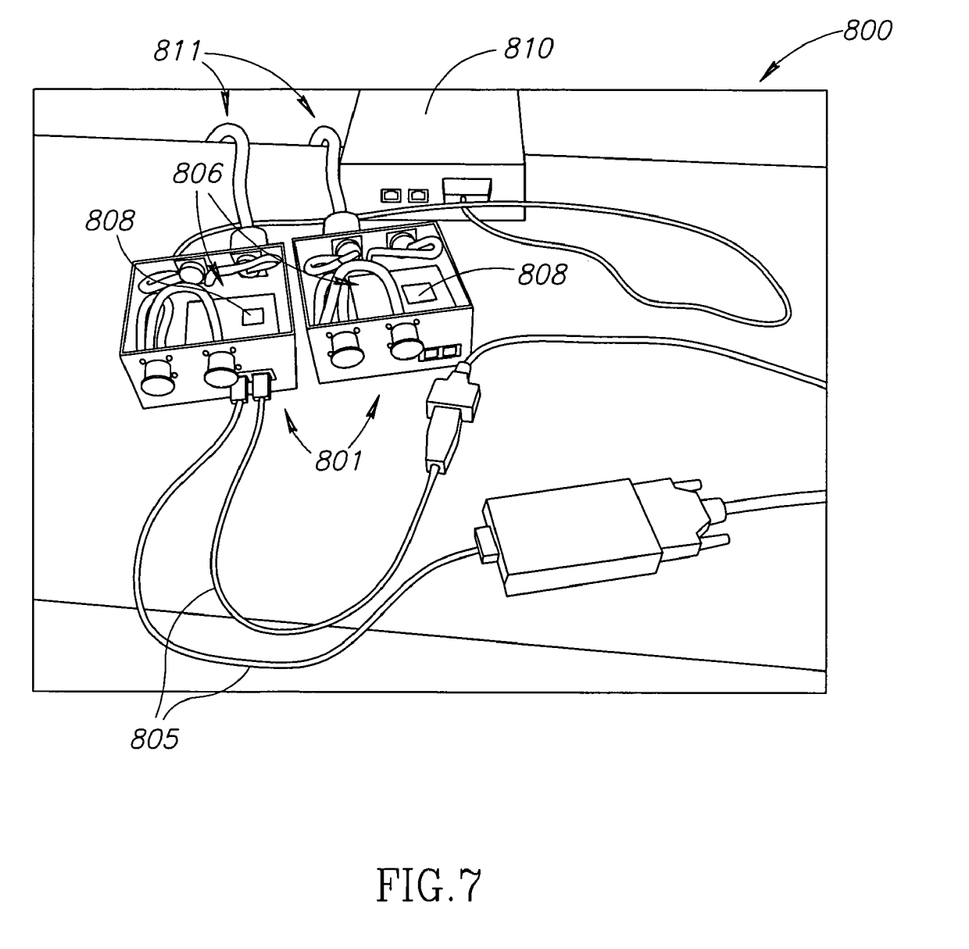
FIG. 7 is an isometric view of a multiple input instrumentation system in accordance with an embodiment of the invention.
Figure 8:
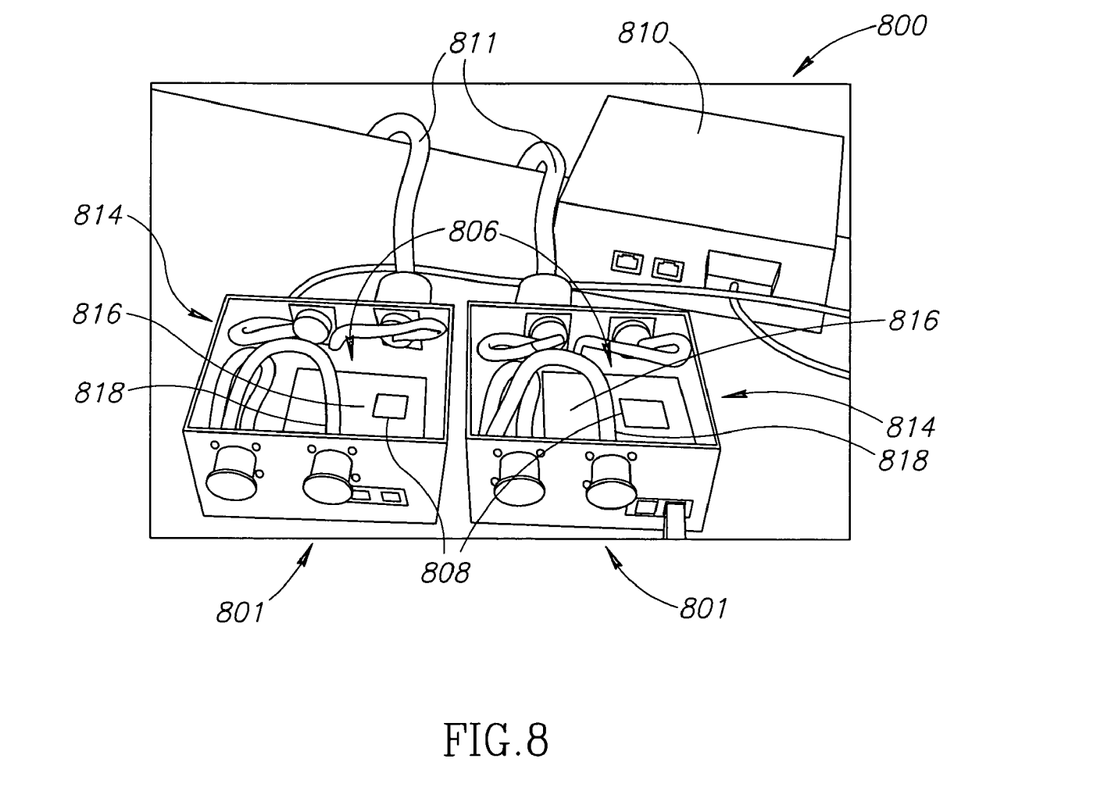
FIG. 8 is an enlarged view of a pair of units of the system of FIG. 7.
Figure 9:
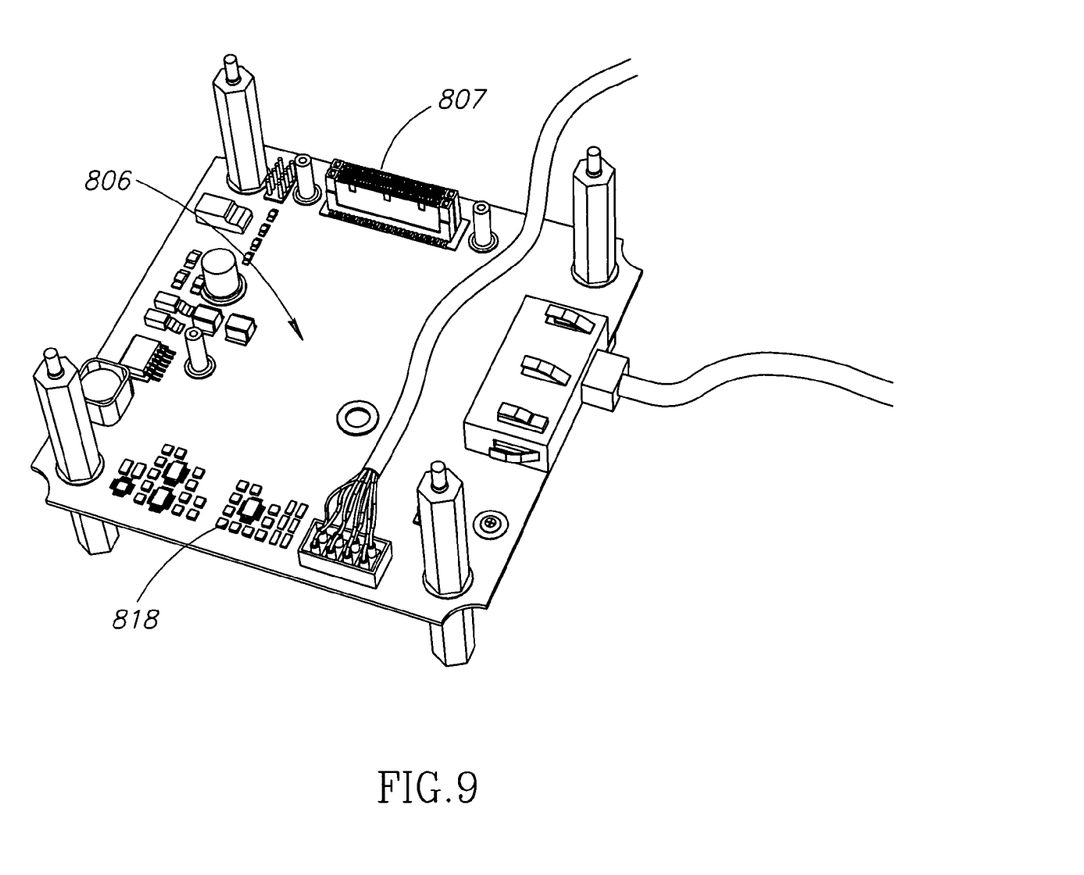
FIG. 9 is an enlarged bottom view of a TBIM of the system of FIG. 7.

It will be appreciated that embodiments of the present invention may be implemented in a variety of systems and networks that include multiple input instrumentation buses for use with, for example, multiple distributed transducers. For example, FIG. 7 is an isometric view of a multiple input instrumentation system 800 in accordance with an embodiment of the invention. FIG. 8 is an enlarged view of a pair of TBIMs 802 of the system 800 of FIG. 7. FIG. 9 is an enlarged top isometric view of a TBIM 802 of the system 800 of FIG. 7.

In the embodiment shown in FIGS. 7-9, the multiple input instrumentation system 800 includes a pair of units 801, each having a TBIM node 808 placed on top of a TBIM 806. A Network Capable Application Processor (NCAP) 810 is coupled to the TBIMs 806 by cables 811, each cable 811 having, in one particular embodiment, four pairs of conductors. Transmission lines 805 couple the units 801 to each other and to other components (e.g. sensors, transducers, memory device, processor, Ethernet, etc.) of the system 800. In some embodiments, the transmission lines 805 may be used to program the TBIMs 806.

As best shown in FIG. 9, each TBIM 806 has a connector 807 adapted for coupling the TBIM 806 with its corresponding TBIM node 808 (FIGS. 7 and 8). The TBIM 806 includes a printed wiring assembly (PWA) 814. In one embodiment, the PWA 814 includes an Ethernet daughter card 816 that implements the TBIM node 808, and a TBIM PWA 818. FIG. 9 shows the near side of the TBIM PWA 818 with the Ethernet daughter card 816 removed. The Ethernet daughter card 816 and the TBIM PWA 818 may be connected together using, for example, one or more 100 pin mating connectors. This interface may be the PII. A similar Ethernet daughter card may be contained inside the NCAP 810 and may serve as a TBC node, and may also interface via the PII to a TBC main board.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A bus assembly, comprising:
    a control module configured to be coupled to a network;
    a plurality of nodes operatively coupled in a linear topology, a first one of the nodes being further coupled to the control module; and
    a plurality of interface modules, each interface module being coupled to a corresponding one of the nodes, wherein at least one node is configured to receive a primary response signal from the correspondingly coupled interface module and a secondary response signal from at least one other node, and to determine which of the primary and secondary response signals arrived first, and to output a corresponding one of the primary and secondary response signals that arrived first, the plurality of interface modules being further configured to communicate in both isochronous and asynchronous modes of communication, wherein
        the asynchronous mode being based on a discipline schema having a plurality of asynchronous time slots, wherein a corresponding one of the asynchronous time slots has a value corresponding to at least one of a try until acknowledged command, a send UUID command, and a retransmit last data packet command, and
        the isochronous mode being based on a Time Division Multiple Access (TDMA) allocation of bandwidth, the TDMA allocation of bandwidth including subdividing the isochronous interval into the following four segments: start time uncertainty segment; data packet segment; Inter Frame Gap (IFG) segment; and an unused mode of the time slot segment.

2. The bus assembly of claim 1, wherein at least one node is further adapted to receive a control signal and to transmit the control signal to at least one other node and to the correspondingly coupled interface module.

3. The bus assembly of claim 1, wherein the at least one node is further adapted to discard the other of the primary and secondary response signals that did not arrive first.

4. The bus assembly of claim 1, wherein the control module includes a transducer bus controller and a controller node coupled to the transducer bus controller and to the first one of the nodes, and wherein the plurality of interface modules includes at least one transducer bus interface module.

5. The bus assembly of claim 1, wherein the interface modules are further configured to communicate in the isochronous mode followed by the asynchronous mode of communication using a data rate of at least 100 mb/s.

6. An instrumentation system, comprising:
    a plurality of input sources;
    a communication link configured to communicate using both isochronous and asynchronous modes of communication, wherein
        the asynchronous mode being based on a discipline schema having a plurality of asynchronous time slots, wherein a corresponding one of the asynchronous time slots has a value corresponding to at least one of a try until acknowledged command, a send UUID command, and a retransmit last data packet command, and
        the isochronous mode being based on a Time Division Multiple Access (TDMA) allocation of bandwidth, the TDMA allocation of bandwidth including subdividing the isochronous interval into the following four segments: start time uncertainty segment; data packet segment; Inter Frame Gap (IFG) segment; and an unused mode of the time slot segment; and
    a bus assembly operatively coupled to the plurality of input sources and to the communication link, the bus assembly including:
        a control module operatively coupled to the communication link;
        a plurality of nodes operatively coupled in a linear topology, a first one of the nodes being further coupled to the control module; and
        a plurality of interface modules, each interface module being coupled to a corresponding one of the nodes, wherein at least one node is configured to receive a primary response signal from the correspondingly coupled interface module and a secondary response signal from at least one other node, and to determine which of the primary and secondary response signals arrived first, and to output a corresponding one of the primary and secondary response signals that arrived first.

7. The system of claim 6, wherein the at least one node is further adapted to receive a control signal and to transmit the control signal to at least one other node and to the correspondingly coupled interface module.

8. The system of claim 6, wherein the asynchronous mode includes a discipline scheme to prevent collisions between responses of simultaneously responding interface modules.

9. The system of claim 6, wherein the asynchronous mode includes a discipline scheme having a plurality of asynchronous time slots.

10. A method of transmitting information along a multi-drop bus, comprising:
    providing a plurality of nodes operatively coupled in a linear topology;

providing a plurality of interface modules, each interface module being coupled to a corresponding one of the nodes, the plurality of interface modules being configured to communicate using both isochronous and asynchronous modes of communication, the asynchronous mode being based on a discipline schema having a plurality of asynchronous time slots, wherein a corresponding one of the asynchronous time slots has a value corresponding to at least one of a try until acknowledged command, a send UUID command, and a retransmit last data packet command;

receiving a primary response signal at a first one of the nodes from the correspondingly coupled interface module;

receiving a secondary response signal at the first one of the nodes from at least one other node;

determining which of the primary and secondary response signals arrived earlier; and outputting the earlier-arriving one of the primary and secondary response signals, wherein communicating using an isochronous mode includes communicating using an isochronous mode based on a Time Division Multiple Access (TDMA) allocation of bandwidth, and wherein communicating using an isochronous mode based on a TDMA allocation of bandwidth includes subdividing the isochronous interval into the following four segments: start time uncertainty segment; data packet segment; Inter Frame Gap (IFG) segment; and an unused mode of the time slot segment.

11. The method of claim 10, further comprising receiving a control signal and transmitting the control signal to the at least one other node and to the correspondingly coupled interface module.

12. The method of claim 10, further comprising discarding the other of the primary and secondary response signals that did not arrive first.

13. The method of claim 10, wherein at least one of the receiving a primary response signal, and receiving a secondary response signal, and outputting the earlier-arriving one using a communication unit that includes an isochronous mode followed by an asynchronous mode.

14. The method of claim 10, wherein the unused portion of the time slot segment has a predefined time of 200 microseconds and is used to transmit the start asynchronous interval message.

* * * * *